(12) United States Patent
Tagami et al.

(10) Patent No.: US 7,918,324 B2
(45) Date of Patent: Apr. 5, 2011

(54) DRIVING FORCE INTERRUPTING MECHANISM

(75) Inventors: Takuya Tagami, Wako (JP); Dai Arai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 12/140,652

(22) Filed: Jun. 17, 2008

(65) Prior Publication Data
US 2009/0014272 A1   Jan. 15, 2009

(30) Foreign Application Priority Data

Jul. 13, 2007   (JP) ................................ 2007-184794

(51) Int. Cl.
*F16D 11/10* (2006.01)
*G05G 5/24* (2006.01)
(52) U.S. Cl. .................. 192/69.9; 192/114 R; 192/99 S; 74/335
(58) Field of Classification Search .................. 192/69.9
See application file for complete search history.

(56) References Cited

U.S. PATENT DOCUMENTS

| 4,753,331 A * | 6/1988 | Dietenberger et al. ...... 192/69.9 |
| 2006/0174723 A1* | 8/2006 | Tagami ........................... 74/325 |
| 2007/0089553 A1* | 4/2007 | Busch et al. .................... 74/335 |
| 2008/0035410 A1* | 2/2008 | Kosugi et al. ................. 180/383 |

FOREIGN PATENT DOCUMENTS

| JP | 2006-218979 | 8/2006 |
| WO | WO2006/003878 | * 1/2006 |

* cited by examiner

*Primary Examiner* — David D Le
*Assistant Examiner* — Jacob S Scott
(74) *Attorney, Agent, or Firm* — Ditthavong Mori & Steiner, P.C.

(57) ABSTRACT

A driving force interrupting mechanism includes input and output members. A coupling sleeve is to be movable on the input and output members along a rotational axis. A fork is swingable around a swing shaft to move the coupling sleeve between a connecting position and a disconnecting position. The coupling sleeve is positioned on both of the input and output members in the connecting position. The coupling sleeve is positioned on either the input member or the output member in the disconnecting position. An operating member is integrally rotatable with the swing shaft. A spring is provided on the swing shaft between the operating member and the fork relatively rotatably with respect to the swing shaft. A motion of one of the operating member and the fork follows a motion of another of the operating member and the fork via an elastic force of the spring.

8 Claims, 8 Drawing Sheets

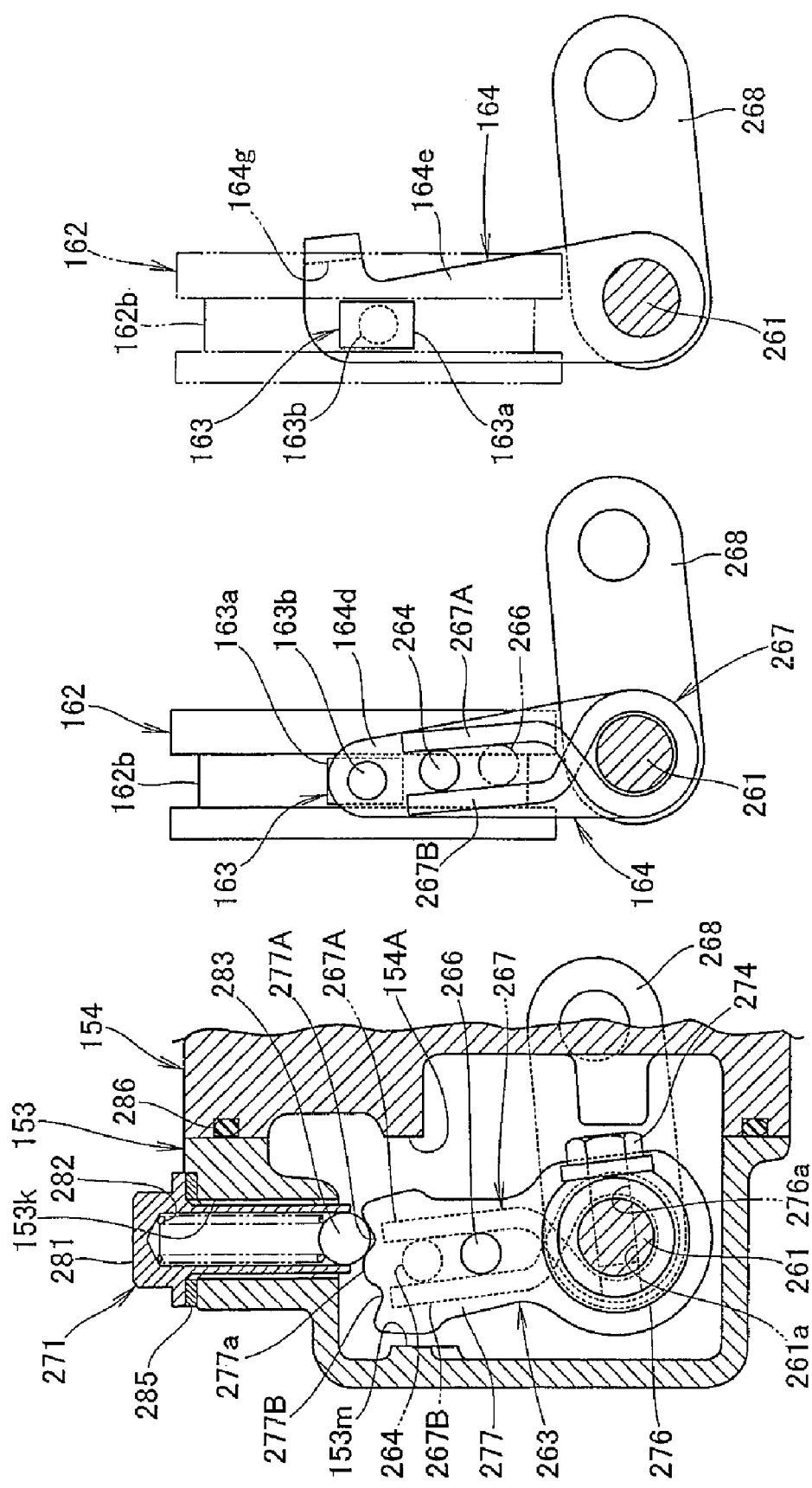

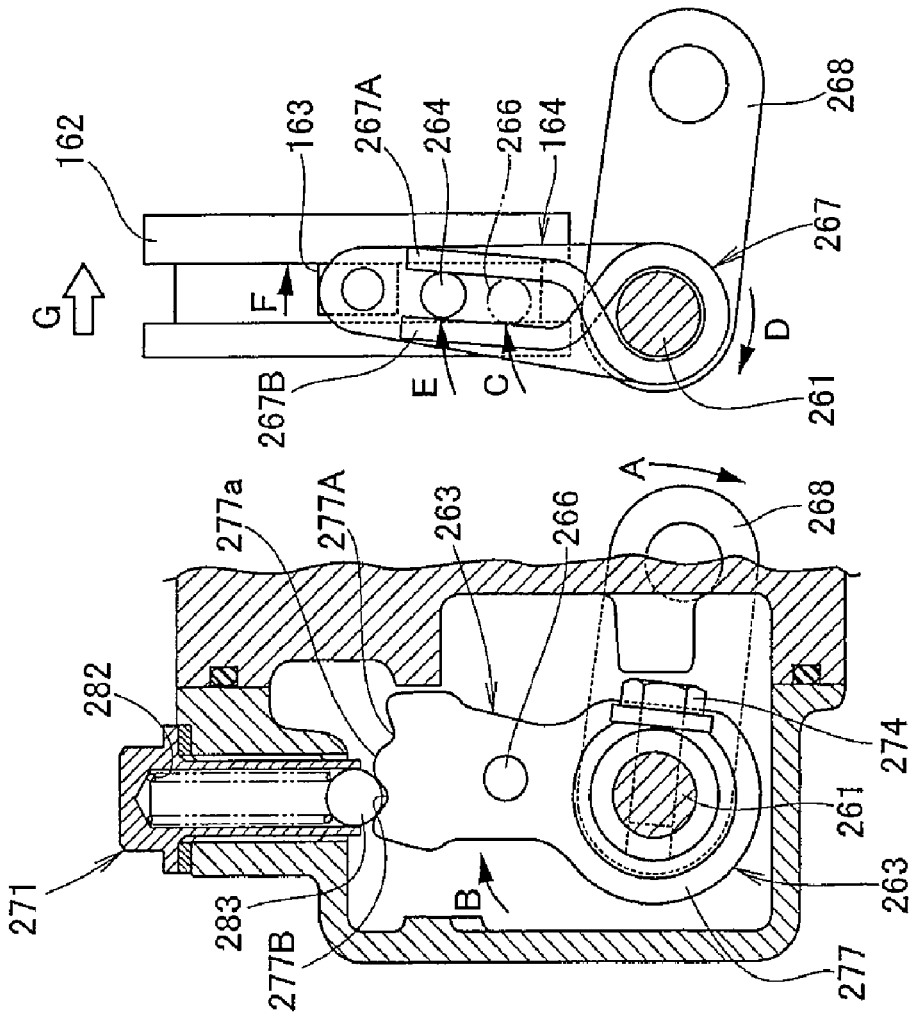
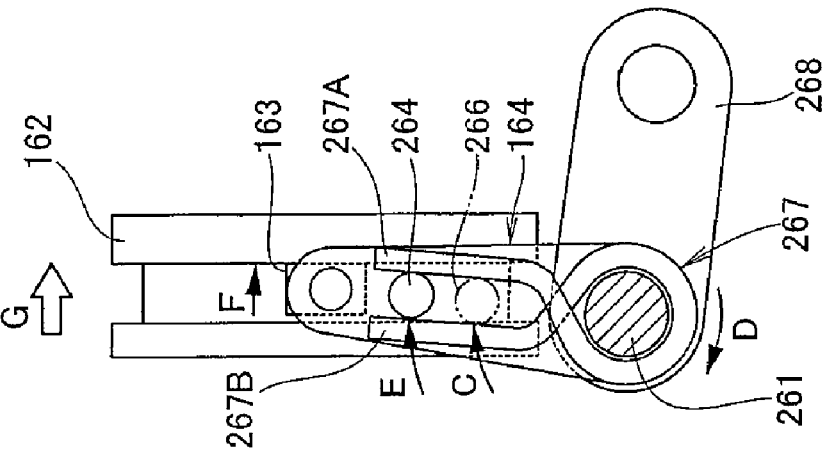
FIG. 7A  FIG. 7B  FIG. 7C

DRIVING FORCE INTERRUPTING MECHANISM

CROSS-REFERENCE TO RELATED APPLICATIONS

The present application claims priority under 35 U.S.C. §119 to Japanese Patent Application No. 2007-184794, filed Jul. 13, 2007, The contents of this application are incorporated herein by reference in their entirety.

BACKGROUND OF THE INVENTION

1. Field of the Invention

The present invention relates to a driving force interrupting mechanism.

2. Discussion of the Background

A conventional driving force interrupting mechanism configured as follows has been known (see, for example, Japanese Patent Application Publication No. 2006-218979). Specifically, in this mechanism, a driving shaft is provided between a drive source side and a final reduction gear unit provided on a wheel side. This driving shaft is divided into an input shaft and an output shaft. A coupling sleeve is movably fitted on these input and output shafts. When this coupling sleeve is fitted on only one of the input and output shafts, the transmission of the driving force to the final reduction gear unit is interrupted. On the other hand, when the coupling sleeve is fitted on both of the input and output shafts, the driving force is transmitted to the final reduction gear unit from the drive source side.

FIG. 5 and FIG. 6 of Japanese Patent Application Publication No. 2006-218979 will be described below.

The above-described mechanism for moving a coupling sleeve 162 includes: a first housing 153; a support shaft 261 rotatably attached to the first housing 153; a fork 164 swingably mounted on the support shaft 261, and connected to an outer circumference of the coupling sleeve 162; a first helical torsion spring 266 which biases the fork 164 in a direction of transmitting the driving force; and a second helical torsion spring 267 which biases the fork 164 in a direction of interrupting the driving force.

Swinging a lever 268 attached to an end portion of the support shaft 261 rotates the support shaft 261, thereby causing the fork 164 to swing in association with the first helical torsion spring 266. As a result, the coupling sleeve 162 moves. Because a male spline is formed on each of the aforementioned input and output shafts, the coupling sleeve is sometimes not fitted immediately on the other one of the input and output shafts depending on the rotational position of the corresponding male spline. In this case, the fork 164 swings only partway. However, the lever 268 and the support shaft 261 are capable of rotating further in association with the first helical torsion spring 266. What is achieved by the above mechanism is this rotation, that is, a lost motion, of the lever 268 and the support shaft 261 along with no swing of the fork 162 at this event.

The contents of Japanese Patent Application Publication No. 2006-218979 are incorporated herein by reference in their entirety.

The above-described driving force interrupting mechanism with the lost motion mechanism requires two helical springs, that is, the first helical torsion spring 266 acting in the direction of transmitting the driving force and the second helical torsion spring 267 acting in the direction of interrupting the driving force, and also requires components operating together with these springs. Accordingly, components are increased in number and complexity, thus occupying a large space in the first housing 153. As a result, the first housing 153 becomes large in size.

SUMMARY OF THE INVENTION

According to one aspect of the present invention, a driving force interrupting mechanism includes a housing, a driving member, a coupling sleeve, a swing shaft, a fork, an operating member, and a spring. The driving member is rotatably supported in the housing to transmit a driving force and includes an input member and an output member which have a common rotational axis and each of which has a spline. The coupling sleeve is spline-connected to at least one of the input member and the output member to be movable on the input member and the output member along the rotational axis. The fork is attached to the housing swingably around the swing shaft to move the coupling sleeve between a connecting position and a disconnecting position. The coupling sleeve is positioned on both of the input member and the output member in the connecting position. The coupling sleeve is positioned on either the input member or the output member in the disconnecting position. The operating member is integrally rotatable with the swing shaft. The spring is provided on the swing shaft between the operating member and the fork relatively rotatably with respect to the swing shaft. A motion of one of the operating member and the fork follow a motion of another of the operating member and the fork via an elastic force of the spring.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is explanatory views showing the driving force interrupting mechanism according to the embodiment of the present invention as viewed in a direction along a support shaft;

FIG. 7 is first operational views showing the operation of the driving force interrupting mechanism according to the embodiment of the present invention.

DESCRIPTION OF THE EMBODIMENTS

Figure 1:
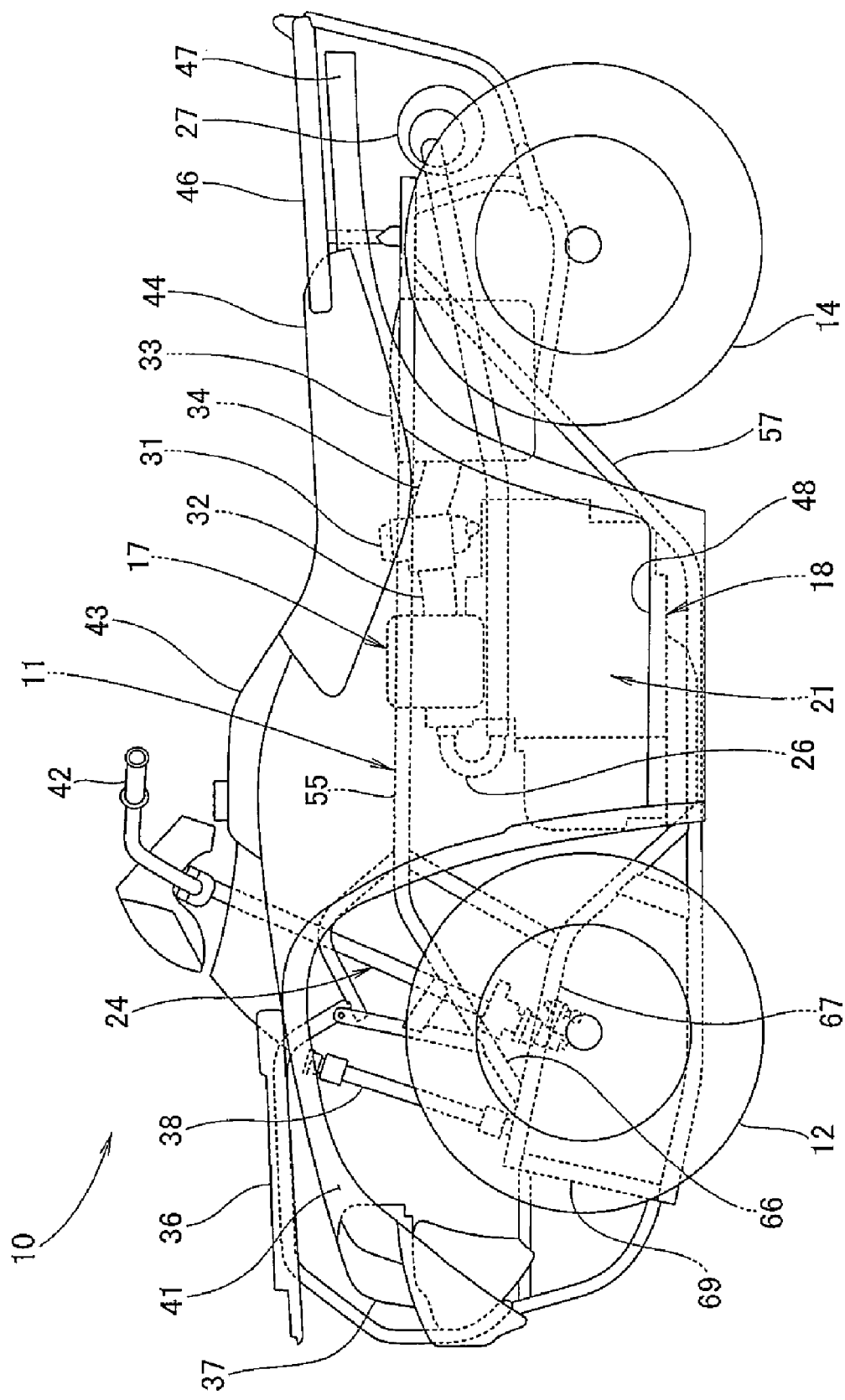
FIG. 1 is a side view of a vehicle equipped with a driving force interrupting mechanism according an embodiment of the present invention.

The embodiments will now be described with reference to the accompanying drawings, wherein like reference numerals designate corresponding or identical elements throughout the various drawings.

The embodiment of the present invention makes it possible to reduce the number of components for a driving force interrupting mechanism, and also to reduce the size of the housing, and further, to achieve a lost motion with a simple mechanism.

An embodiment of the present invention provides a driving force interrupting mechanism which includes: a housing; a driving member being rotatably supported in the housing so as to transmit a driving force, and consisting of an input member and an output member disposed coaxially with the input member, each of the input and output shafts having a spline formed thereon; a coupling sleeve provided on one of the input and output members while being spline-connected thereto so as to be movable in the axial direction; a swing shaft; and a fork for moving the coupling sleeve so as to allow the coupling sleeve to be spline-connected also to the other one of the input and output members in a straddling manner, the fork swingably attached to the housing with the swing shaft. The driving force interrupting mechanism transmits the driving force by connecting the input and output members to each other with the coupling sleeve, and interrupts the driving force by disconnecting the coupling sleeve from the other one of the input and output members. The driving force interrupting mechanism is characterized by including: a spring mounted on the swing shaft so as to be rotatable relative to the swing shaft; and an operating member rotating integrally with the swing shaft. The driving force interruption is also characterized in that the spring is provided between the operating member and the fork, and that a motion of one of the operating member and the fork is followed by the other one thereof in association with an elastic force of the spring.

The driving force interrupting mechanism according to the embodiment operates in the following manner. For example, when the swing shaft is rotated so as to swing the operating member, the operating member presses the fork in association with the spring. Accordingly, the fork is swung about the swing shaft, so that the coupling sleeve is moved to connect the input and output shafts to each other.

In this event, the coupling sleeve moves from one to the other of the input member and the output member in a straddling manner. At this time, if the spline of the coupling sleeve does not mesh with the spline of the other one of the input and output members, the fork stops moving. However, the operating member continues to swing, so that the distortion of the spring increases and thus the elastic force of the spring increases. In this state, the spring continues to press the fork until the splines mesh with each other. Once the splines mesh with each other, the fork is moved by the elastic force of the spring. As a result, the input member and the output member are connected to each other by the coupling sleeve.

On the other hand, consider the following case. In a state where the input member and the output member are connected to each other by the coupling sleeve, the swing shaft is rotated in a direction opposite to that described above, so that the operating member is swung. In this case, because the operating member presses the fork in association with the spring, the fork is swung about the swing shaft. Accordingly, the coupling sleeve moves to be connected to only one of the input member and the output member. As a result, the connection of the input and output shaft is released.

At this event, when frictional force between the coupling sleeve and the input shaft, as well as between the coupling sleeve and the output shaft is large, the coupling sleeve does not move, and hence, the connection of the input and output shafts is not released. In this case, the fork is not moved, but the operating member continues to swing. Accordingly, the distortion of the spring increases, so that the elastic force of the spring increases. In this state, the spring continues to press the fork until the frictional force becomes small. Once the frictional force becomes small, the fork is moved by the elastic force of the spring, so that the coupling sleeve is moved to release the connection of the input and output shafts. As a result, the input member and the output member are allowed to rotate relative to each other.

The above-described state where only the operating member moves while the movement of the fork is stopped is referred to as a lost motion. This lost motion prevents an insecure operation of the operating member from interfering with the movement of the coupling sleeve to a predetermined position. Here, such insecure operation of the operating member would be caused by, for example, dimensional or mounting errors of each of components of an operating system for operating the operating member with the swing shaft, and also an expansion of a wire in a case where the swing shaft is operated with the wire.

The lost motion has conventionally been achieved with two springs, but the embodiment of the present invention requires only one spring. As a result, the lost motion can be achieved with a less number of components with a simple structure.

According to an embodiment of the present invention, the spring is a helical torsion spring, and the two end portions of the helical torsion spring abut respectively on the operating member and the fork.

The driving force interrupting mechanism according to the embodiment operates as follows. When one of the operating member and the fork swings, the distance between the two end portions of the helical torsion spring increases or decreases, so that the elastic force of the spring increases. The increased elastic force acts on the other one of the operating member and the fork, thus causing the other one of the operating member and the fork to follow the one to swing.

According to an embodiment of the present invention, projections are provided respectively on the operating member and the fork, and these projections are disposed between the two end portions of the spring.

The driving force interrupting mechanism according to the embodiment operates as follows. Disposing the protrusions respectively of the operating member and the fork in a space between the two end portions of the spring makes it possible to efficiently utilize that space.

According to an embodiment of the present invention, the operating member and the fork are arranged along the swing shaft, and the spring is provided between the operating member and the fork.

The driving force interrupting mechanism according to the embodiment operates as follows. This arrangement of the operating member and the fork along the swing shaft makes it possible to compactly arrange the swing shaft, the operating member, and the fork.

According to an embodiment of the present invention, the housing is provided with a positioning mechanism for positioning the operating member at positions corresponding respectively to the connection and interruption of the driving force.

The driving force interrupting mechanism according to the embodiment operates as follows. The operating member is positioned by the positioning mechanism at a position corresponding to the connection of the driving force, and at a position corresponding to the interruption of the driving force.

According to an embodiment of the present invention, the operating member is provided with notches which are positioned by the positioning mechanism, and the operating member is positioned in a way that a ball included in the positioning member is pressed against any one of the notches.

The driving force interrupting mechanism according to the embodiment operates as follows. In a way that the ball is pressed against any one of the notches, the operating member is positioned at predetermined rotating positions corresponding respectively to the connection and interruption of the driving force.

According to the embodiment of the present invention, the spring and the operating member are provided on the swing shaft. The spring is attached to the swing shaft so as to be rotatable relative to the swing shaft, while the operating member rotates integrally with the swing shaft. The spring is provided between the operating member and the fork, and the motion of one of the operating member and the fork is followed by the other one thereof in association with an elastic force of the spring. This makes it possible to achieve the lost motion with a simple mechanism using the single spring in both of a state where the input and output members are connected to each other as well as a state where the input and output members are not connected to each other. Here, the lost motion refers to a movement of one of the operating member and the fork when the other one does not move in association with the movement of the one of the operating member and the fork. Accordingly, the number of components for the lost motion can be reduced. Moreover, since the space in the housing can be saved along with the reduction in the number of components, the size of the housing can be reduced.

According to the embodiment of the present invention, the spring is the helical torsion spring, and the two end portions of the helical torsion spring abut respectively on the operating member and the fork. Accordingly, a biasing force can be applied, with a simple structure using the helical torsion spring, to the fork in both of a direction of connecting the driving force and a direction of interrupting the driving force. Further, the lost motion of the operating member or the fork can be achieved.

According to the embodiment of the present invention, the projections are provided respectively on the operating member and the fork, and the projections are disposed between the two end portions of the spring. This makes it possible to provide a compact structure in which the operating member and the fork are connected to each other with the projections and the spring in between. As a result, the size of the driving force interrupting mechanism can be reduced.

According to the embodiment of the present invention, the operating member and the fork are arranged along the swing shaft, and the spring is provided between the operating member and the fork. Accordingly, the swing shaft, the operating member, and the fork can be compactly arranged, so that the size of the driving force interrupting mechanism can be reduced.

According to the embodiment of the present invention, the housing is provided with the positioning mechanism for positioning the operating member at positions corresponding respectively to the connection and interruption of the driving force. This makes it possible to securely connect or interrupt the driving force by positioning the operating member at a predetermined position with the positioning mechanism.

According to the embodiment of the present invention, the operating member is provided with notches which are positioned by the positioning mechanism, and the operating member is positioned in a way that the ball included in the positioning member is pressed against any one of the notches. This makes it possible to position the operating member at a predetermined rotational position with a simple structure.

FIG. 1 is a side view of a vehicle including a driving force interrupting mechanism according to the embodiment of the present invention. An all-terrain vehicle 10 as the vehicle includes: a vehicle body frame 11; a pair of front wheels 12, 13 (only reference numeral 12 on the front side in a depth direction of the figure is shown), each of which is attached to a front portion of the vehicle body frame 11 with an unillustrated suspension arm in between; a pair of rear wheels 14 and 15 (only reference numeral 14 on the near side is shown), each of which is attached to a rear portion of the vehicle body frame 11 with an unillustrated suspension arm in between; a power unit 21, which includes an engine 17 and a transmission 18, and which is attached to a center portion of the vehicle body frame 11. The all-terrain vehicle 10 is a part-time four-wheel-drive vehicle which is capable of driving the front wheels 12 and 13 and the rear wheels 14 and 15 with the power unit 21, or driving only the rear wheels 14 and 15 with the power unit 21.

Here, reference numeral 26 denotes an exhaust pipe extending rearward from the front of the engine 17; reference numeral 27 denotes a muffler connected to the rear end of the exhaust pipe 26; reference numeral 31 denotes a carburetor connected to a rear portion of the engine 17 with an intake pipe 32 interposed in between; reference numeral 33 denotes an air cleaner connected to the carburetor 31 with a connecting tube 34 interposed in between. In addition, reference numerals 36, 37, and 38 denote a front carrier, a headlamp, and a radiator, respectively. Moreover, reference numerals 41, 42, 43, and 44 denote a front fender, a handlebar, a fuel tank, and a seat, respectively. Further, reference numerals 46, 47, and 48 denote a rear carrier, a rear fender, and a step, respectively.

The vehicle body frame 11 includes a pair of left and right upper main frames 55 and 56 (only reference numeral 55 on the near side is shown), a pair of left and right lower main frames 57 and 58 (only reference numeral 57 on the near side is shown), a pair of left and right front inclined portions 66 and 66 (only reference numeral 66 on the near side is shown), a pair of left and right first inclined frames 67 and 67 (only reference numeral 67 on the near side is shown), and a pair of left and right joint frames 69 and 69. The left and right upper main frames 55 and 56 extend in the front-rear direction. The left and right lower main frames 57 and 58 are disposed below the upper main frames 55 and 56, and are connected respectively to the rear ends of the upper main frames 55 and 56. The left and right front inclined portions 66 and 66 are provided respectively at the front portions of the upper main frames 55 and 56. The first inclined frames 67 and 67 are joined respectively to the front inclined portions 66 and 66, and are also joined respectively to the lower main frames 57 and 58. The front ends of the first inclined frames 67 and 67 as well as the front ends of the lower main frames 57 and 58 are connected to the corresponding joint frames 69 and 69.

Figure 2:
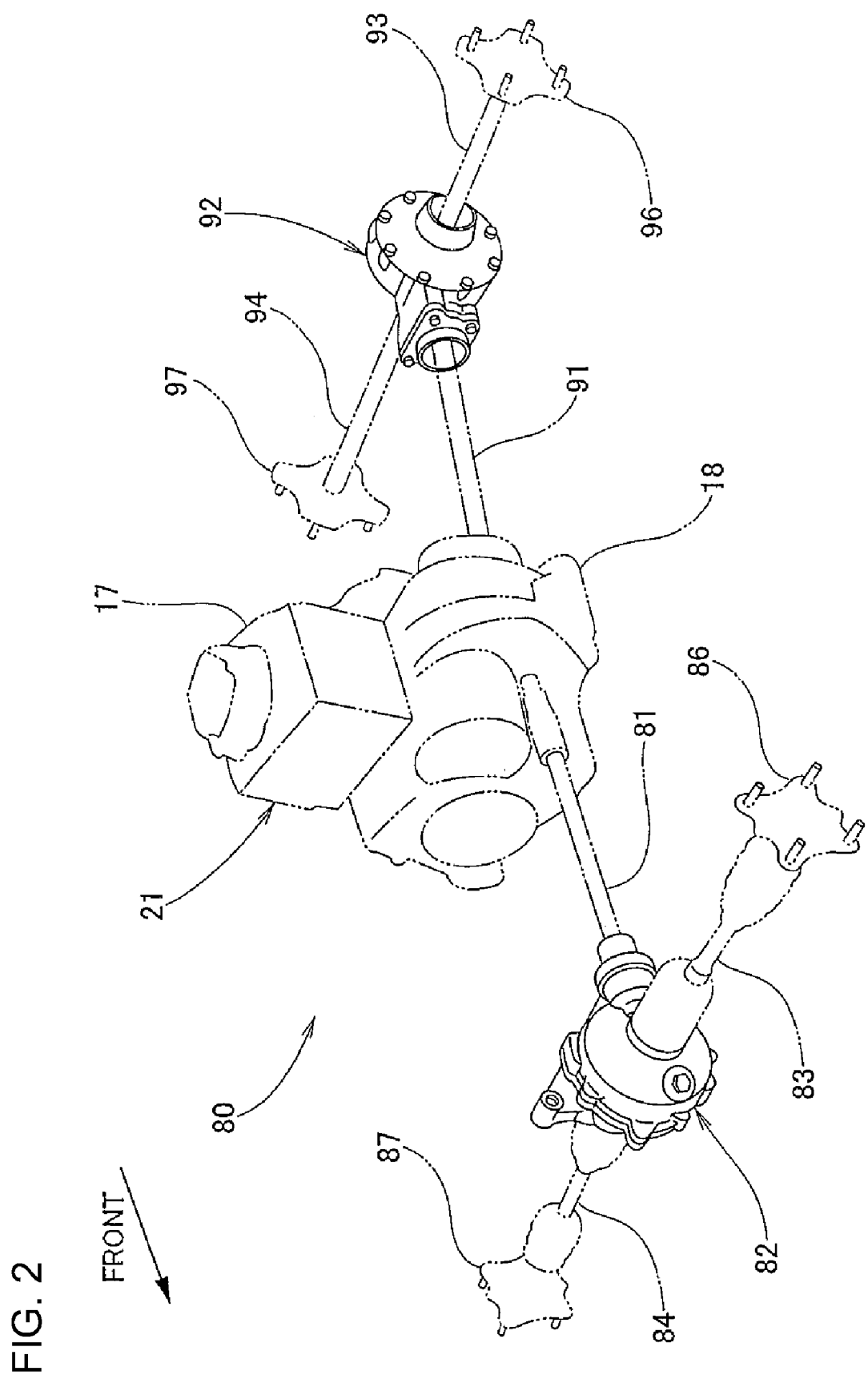
FIG. 2 is a perspective view showing a powertrain system of the vehicle according to the embodiment of the present invention.

FIG. 2 is a perspective view showing a powertrain system of the vehicle according to the embodiment of the present invention. The arrow (FRONT) in the figure indicates the forward direction of the vehicle (the same is applied herein).

A powertrain system 80 includes: a front propeller shaft 81 extending frontward from a lower portion of the power unit 21; a front final assembly 82 joined to the front end of the front propeller shaft 81; front drive shafts 83 and 84 joined respectively to the left and right sides of the front final assembly 82; hubs 86 and 87 joined respectively to the tip ends of the front drive shafts 83 and 84; a rear propeller shaft 91 extending rearward from a lower portion of the power unit 21; a rear final assembly 92 joined to the rear end of the rear propeller shaft 91; rear drive shafts 93 and 94 joined respectively to the left and right sides of the rear final assembly 92; and hubs 96 and 97 joined respectively to the tip ends of the rear drive shafts 93 and 94.

The hubs 86, 87, 96, and 97 are members to which the front wheel 12, the front wheel 13 (not illustrated), the rear wheel 14, and the rear wheel 15 (not illustrated), which are shown in FIG. 1, are attached, respectively.

Figure 3:
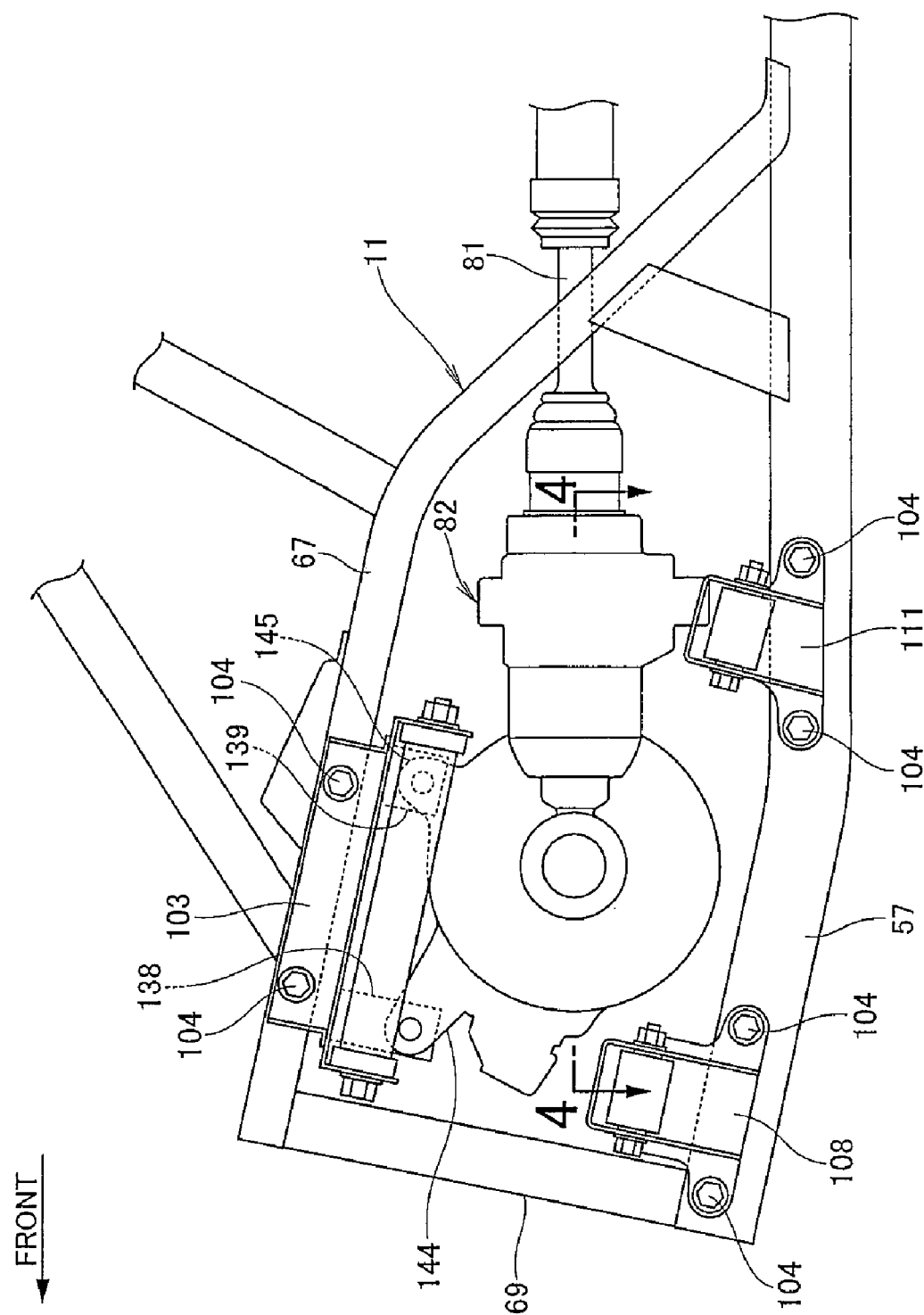
FIG. 3 is a side view showing the structure of a suspension mounting portion of the vehicle according to the embodiment of the present invention.

FIG. 3 is a side view showing the structure of a suspension mounting portion of the vehicle according to the embodiment of the present invention. An upper bracket 103 that supports an upper arm serving as a suspension arm is mounted on front end portions of the respective first inclined frames 67 and 67 (only reference numeral 67 on the near side is shown) with multiple bolts 104. A lower front bracket 108 and a lower rear bracket 111 that support a lower arm serving as a suspension arm are mounted on front end portions of the lower main frames 57 and 58 (only reference numeral 57 on the near side is shown) with multiple bolts 104. Lower projections 138 and 139 are provided to the upper bracket 103. Upper mounting portions 144 and 145 are provided to the front final assembly 82. The upper mounting portion 144 is mounted on the lower projection 138, while the upper mounting portion 145 is mounted on the lower projection 139. In this manner, the front final assembly 82 is fixed to the vehicle body frame 11, as shown in FIG. 3.

Figure 4:
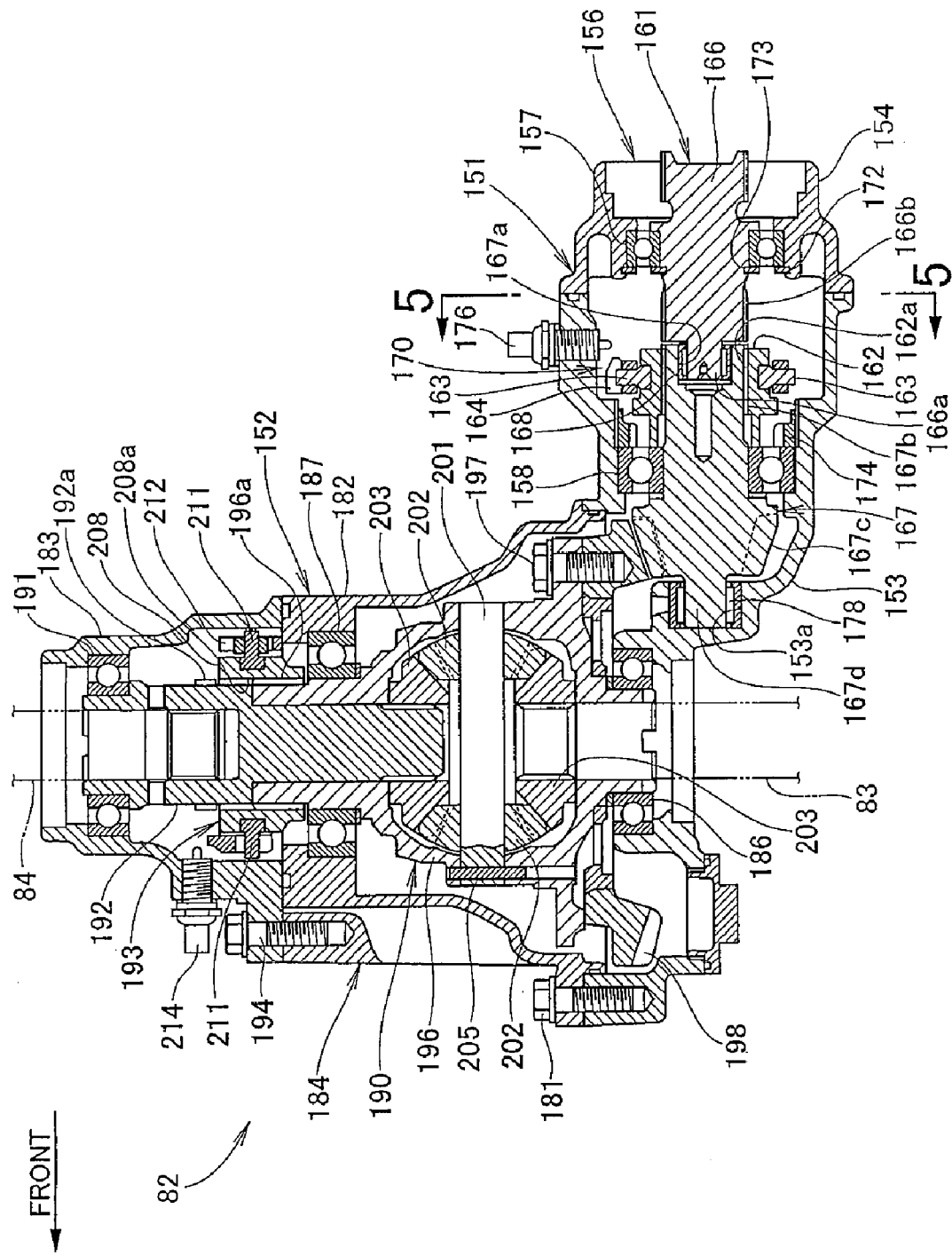
FIG. 4 is a cross-sectional view taken along the line 4-4 in FIG. 3.

FIG. 4 is a cross-sectional view taken along the line 4-4 in FIG. 3. The front final assembly 82 is a final reduction gear unit including: an input-side mechanism 151; and an output-side mechanism 152 which is integrally joined to the input-side mechanism 151. The front final assembly 82 includes the driving force interrupting mechanism according to the embodiment of the present invention in the input-side mechanism 151.

The input-side mechanism 151 includes a first housing 156, a driving shaft 161, a coupling sleeve 162, and a fork 164. The first housing 156 consists of a first housing body 153 and a first housing cover 154 covering one end side of the first housing body 153. The driving shaft 161 is rotatably supported with bearings 157 and 158 in the first housing 156. The coupling sleeve 162 is spline-connected to the driving shaft 161 and attached thereto to be movable in the axial direction. The fork 164 moves the coupling sleeve 162 in the axial direction with joint pieces 163 and 163.

The driving shaft 161 consists of: an input shaft 166 joined to the front propeller shaft 81 (see FIG. 2); and an output shaft 167 arranged coaxially with the input shaft 166. A small-diameter convex portion 166a is formed on an end portion of the input shaft 166, while a fitting hole 167a is formed in an end portion of the output shaft 167. In the driving shaft 161, the small-diameter convex portion 166a is rotatably fitted into the fitting hole 167a with a needle bearing 168.

The input shaft 166 is a member having a male spline 166b which is formed to be connected to a female spline 162a formed in the coupling sleeve 162.

The output shaft 167 is a member having: a male spline 167b which is formed therein to be connected to the female spline 162a of the coupling sleeve 162; and a small bevel gear 167c and a small-diameter convex portion 167d which are integrally formed at the end portion of the output shaft 167. The small-diameter convex portion 167d is rotatably fitted into a fitting concave portion 153a of the first housing body 153 with a needle bearing 178.

The coupling sleeve 162, the joint pieces 163 and 163, the fork 163, which are described above, are members constituting part of a driving force interrupting mechanism 170 for interrupting the driving force from input shaft 166 to the output shaft 167.

The driving force interrupting mechanism 170 is provided with a lost motion mechanism which will be described later.

Here, reference numeral 172 denotes a snap ring for fixing the bearing 157 onto the first housing cover 154; reference numeral 173 denotes a snap ring for fixing the bearing 157 onto the input shaft 166; reference numeral 174 denotes a lock nut for fixing the bearing 158 to the first housing body 153; and reference numeral 176 denotes a position detecting switch for detecting the position of the coupling sleeve 162 in conjunction with the fork 164.

The output-side mechanism 152 includes a second housing 184, a differential gear unit 190, an intermediate shaft 192, and a differential locking device 193. The second housing 184 is consisting of: a second housing body 182 connected to the first housing body 153 with multiple bolts 181 (only one bolt 181 is shown in the figure); and a second housing cover 183 covering one end side of the second housing body 182. The differential gear unit 190 is rotatably supported with bearings 186 and 187 in the second housing body 182. The intermediate shaft 192 is connected to the differential gear unit 190, and is rotatably supported with a bearing 191 in the second housing cover 182. The differential locking device 193 connects the differential gear unit 190 and the intermediate shaft 192 to each other so as to perform the differential lock. Note that multiple reference numerals (only one of them is shown in the figure) 194 denote bolts for mounting the second housing cover 183 on the second housing body 182.

The differential gear unit 190 consists of a differential case 196, a large bevel gear 198, a gear shaft 201, differential small bevel gears 202 and 202, and differential large bevel gears 203 and 203. The large bevel gear 198 is attached to an end portion of the differential case 196 with multiple bolts 197 (only one bolt 197 is shown in the figure), and meshes with the small bevel gear 167c of the output shaft 167. The gear shaft 201 is attached to penetrate the differential case 196. The differential small bevel gears 202 and 202 are rotatably mounted on the gear shaft 201. The differential large bevel gears 203 and 203 mash with the differential small bevel gears 202 and 202. Note that, reference numeral 205 denotes a pin for fixing the gear shaft 201 to the differential case 196.

One of the differential large bevel gears 203 is spline-connected to an end portion of the front drive shaft 83, while the other one of the differential large bevel gears 203 is spline-connected to one end portion of the intermediate shaft 192. The other end portion of the intermediate shaft 192 is spline-connected to an end portion of the front drive shaft 84.

The differential locking device 193 includes a sleeve 208 and a fork 212. A male spline 196a is formed on an end portion of the differential case 196, while a male spline 192a is formed on the intermediate shaft 192. The sleeve 208 is mounted on the male spline 196a and the male spline 192a so as to be movable in the axial direction. The fork 212 moves the sleeve 208 in association with joint pieces 211 and 211. A female spline 208a formed in the sleeve 208 is always connected to the male spline 196a of the differential case 196. When the sleeve 208 is moved by the fork 212, the female spline 208a is caused to be spline-connected also to the male spline 192a of the intermediate shaft 192 in a straddling manner, so that the differential case 196 and the intermediate shaft 192 are integrally rotated. In other words, the differential locking device 193 performs the differential lock so as to lock the differential rotations of the respective front drive shafts 83 and 84, thereby integrally rotating the front drive shafts 83 and 84. Note that, reference numeral 214 denotes a position detecting switch for detecting the position of the sleeve 208 in association with the fork 212.

The above-described driving force interrupting mechanism 170 connects the engine 17 (see FIG. 1) side functioning as a driving source to the two front wheels by bringing the input shaft 166 and the output shaft 167 into a connection state, so as to establish the four-wheel drive mode with all the two front wheels and the two rear wheels being driven. On the other hand. The driving force interrupting mechanism 170 disconnects the engine 17 side from the two front wheels by bringing the input shaft 166 and the output shaft 167 into a non-connection state, so as to establish the two-wheel drive mode with only the two rear wheels being driven. In short, the driving force interrupting mechanism 170 is a driving-power switching mechanism for switching the drive mode between the four-wheel drive mode and the two-wheel drive mode.

Figure 5:
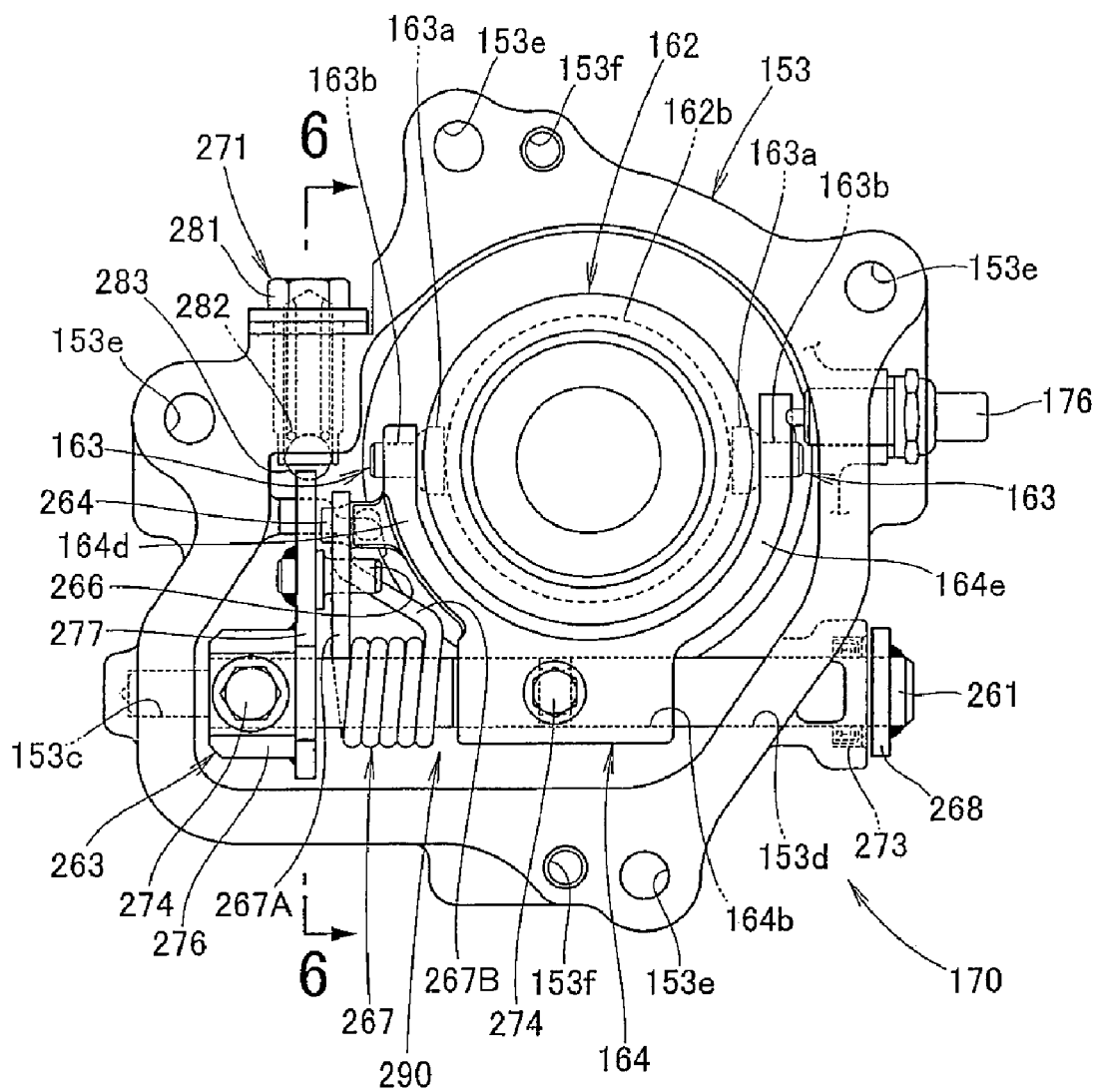
FIG. 5 is an explanatory view showing the driving force interrupting mechanism according to the embodiment of the present invention.

FIG. 5 is an explanatory view showing the driving force interrupting mechanism according to the embodiment of the present invention, and corresponding to a cross section taken along the line 5-5 shown in FIG. 4.

The driving force interrupting mechanism 170 consists of a support shaft 261, a fork 164, an operating member 263, a helical torsion spring 267, a positioning mechanism 271, a lever 268, the aforementioned joint pieces 163 and 163, and the aforementioned coupling sleeve 162. The support shaft 261 is rotatably attached in the first housing body 153, and the fork 164 is swingably mounted on the support shaft 261. The operating member 263 is integrally attached to the support shaft 261. The helical torsion spring 267 is swingably wound around the support shaft 261, and has two end portions 267A and 267B extending upward to sandwich a fork-side projection 264 provided on the fork 164 and a operating-member-side projection 266 provided on the operating member 263. The positioning mechanism 271 sets the swing position of the operating member 263. The lever 268 is attached to an end portion of the support shaft 261.

Each of the joint pieces 163 consists of: a rectangular piece 163a inserted into an outer-circumferential annular groove 162b provided on the outer circumferential surface of the coupling sleeve 162; and a shaft portion 163b extending integrally from the rectangular piece 163a. The shaft portion 163a is rotatably attached to the fork 164.

The fork 164 includes a first arm 164d and a second arm 164e which support the joint pieces 163 and 163, respectively.

Here, reference numerals 153c and 153d denote shaft-supporting holes formed in the first housing body 153 so as to rotatably support the support shaft 261. Multiple reference numerals 153e denote bolt insertion holes through which bolts (not illustrated) for fastening the first housing body 153 and the first housing cover 154 (see FIG. 4) to each other are inserted respectively. Reference numerals 153f and 153f denote knock-pin holes into each of which a knock pin (not illustrated) for positioning the first housing body 153 and the first housing cover 154 is inserted. Reference numeral 164b denotes a shaft-insertion hole formed in the fork 164 so as to allow the support shaft 261 inserted therethrough. Reference numeral 273 denotes a dust seal while reference numeral 274 denotes a bolt for restricting the movement of the fork 164 in the axial direction with respect to the support shaft 261.

Parts (a) to (c) of FIG. 6 are explanatory views showing the driving force interrupting mechanism according to the embodiment of the present invention as viewed in a direction along the support shaft.

Part (a) of FIG. 6 is a cross-sectional view taken along the line 6-6 in FIG. 5. The operating member 263 includes: a boss portion 276 mounted on the support shaft 261 with the bolt 274; and an operating plate 277 mounted on the boss portion 276.

The boss portion 276 has a bolt insertion hole 276a formed therein. The bolt 274 is inserted through the bolt insertion hole 276a, and then screwed into and connected to a female thread 261a formed in the support shaft 261, so that the operating member 263 is mounted on the support shaft 261.

Two notches 277A and 277B are formed in a tip edge of the operating plate 277 so as to be positioned by the positioning mechanism 271. The operating plate 277 is also provided with the operating-member-side projection 266. Note that, reference numeral 277a denotes a bump portion formed between the notches 277A and 277B.

The positioning mechanism 271 is a click mechanism consisting of: a hollow bolt 281 screwed into a female thread 153k formed in the first housing body 153; a compression coil spring 282 disposed in the hollow bolt 281; and a ball 283 pressed against one of the notches 277A and 277B of the operating plate 277 by an elastic force of the compression coil spring 282. Note that, reference numerals 153m and 154a denote stopper portions restricting the swinging of the operating plate 277. Reference numerals 285 and 286 denote a washer and an O-ring, respectively.

Part (b) of FIG. 6 is a side view showing a state where the operating member 263 (see Part (a) of FIG. 6) is detached from the support shaft 261. The helical torsion spring 267 has the two end portions 267A and 267B extending respectively from parts wound around the support shaft 261 so as to intersect with each other. The fork-side projection 264 and the operating-member-side projection 266, as two projections, extending along the axial direction of the support shaft 261 are disposed between these end portions 267A and 267B.

The figure shows that the joint piece 163 on the first arm 164d side of the fork 164 is inserted into the outer circumferential annular groove 162b of the coupling sleeve 162.

Part (c) of FIG. 6 shows that the joint piece 163 on the second arm 164e side of the fork 164 is inserted into the outer circumferential annular groove 162b of the coupling sleeve 162. Note that, reference numeral 164g denotes an inclined face formed in a tip end portion of the second arm 164e of the fork 164. The inclined face 164g is a part making it easy for the fork 164 to press a detector of the position detecting switch 176 (see FIG. 5) when swinging.

Next, the operation of the driving force interrupting mechanism 170 described above will be described.

Parts (a) to (c) of FIG. 7 are first operational views showing the operation of the driving force interrupting mechanism according to the embodiment of the present invention.

In Part (a) of FIG. 7, operating a two-wheel-drive/four-wheel-drive switching lever (not illustrated), which is provided on the handlebar 42 (see FIG. 1) side, causes the lever 268 to be operated in the direction indicated by the arrow A with a wire (not illustrated) connecting them to each other. Along with the operation of the lever 268, the operating member 263 swings in the direction indicated by the arrow B about the support shaft 261. The swing of the operating member 263 causes the ball 283, having been inserted in the notch 277A of the operating member 263 as shown in Part (a) of FIG. 6, of the positioning mechanism 271 to roll over the bump portion 277a of the operating member 263 so as to be inserted in the notch 277B of the operating member 263 as shown in Part (a) of FIG. 7.

Accordingly, in Part (b) of FIG. 7, the operating-member-side projection 266 provided on the operating member 263 presses one of the end portions 267A of the helical torsion spring 267 in the direction indicated by the arrow C, so that the helical torsion spring 267 rotates about the support shaft 261 in the direction indicated by the arrow D. In association with the rotation of the helical torsion spring 267, the end portion 267B presses the fork-side projection 264 in the direction indicated by the arrow E. The fork 164 is thus caused to swing in the direction indicated by the arrow F, so that the coupling sleeve 162 moves in the direction indicated by the hollow arrow G in conjunction with the joint pieces 163.

As a result, as shown in Part (c) of FIG. 7, the coupling sleeve 162, which has been spline-connected to the output shaft 167 as shown in FIG. 4, moves to be spline-connected also to the input shaft 166 in a straddling manner as shown in Part (c) of FIG. 7. Accordingly, the input shaft 166 and the output shaft 167 are connected to each other by the coupling sleeve 162, so that the driving force is transmitted from the input shaft 166 to the output shaft 167.

Figure 8A:
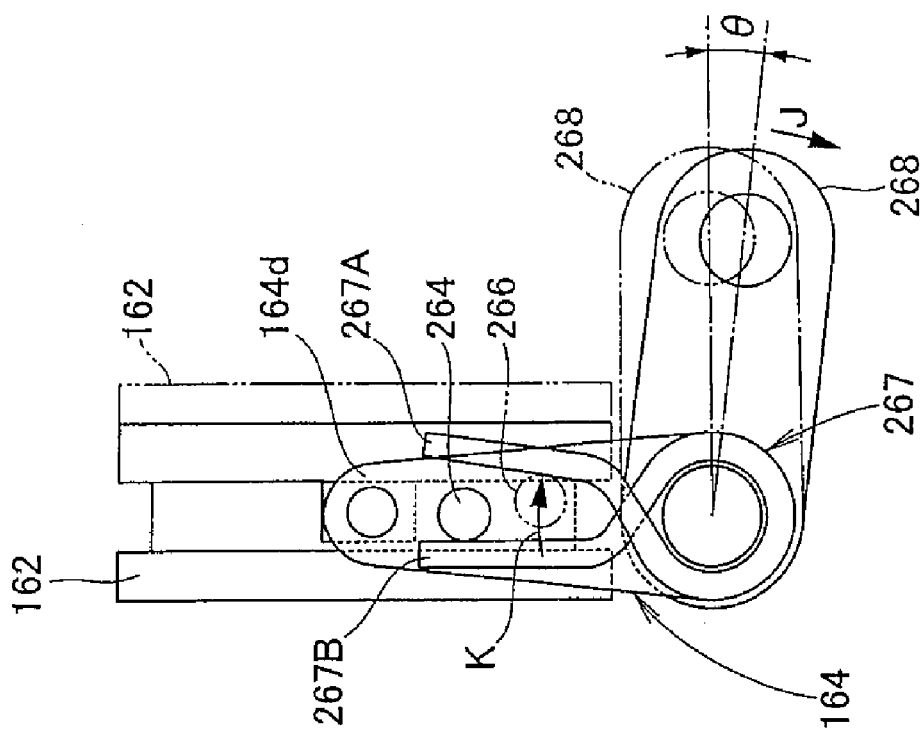
FIG. 8 is second operational views showing the operation of the driving force interrupting mechanism according to the embodiment of the present invention.
Figure 8B:
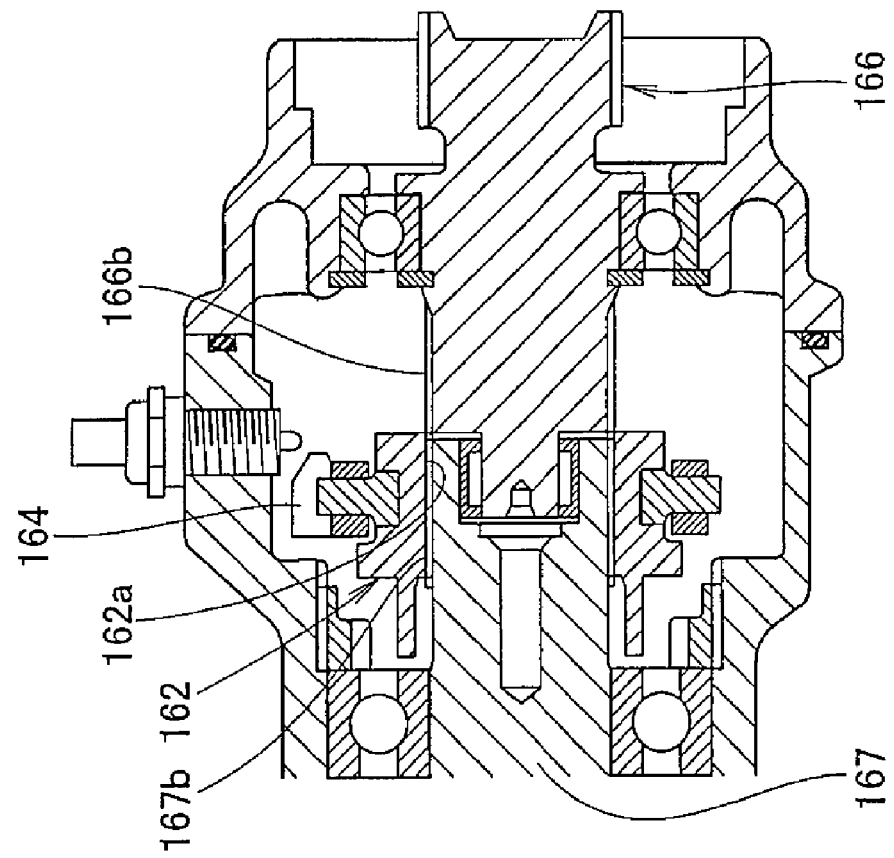

Parts (a) and (b) of FIG. 8 are second operational views showing the operation of the driving force interrupting mechanism according to the embodiment of the present invention. In Part (a) of FIG. 8, consider a case where the coupling sleeve 162 is moved from the output shaft 167 side to the input shaft 166 side, for example. In this case, when the female spline 162a of the coupling sleeve 162 and male spline 166b of the input shaft 166 do not mesh with each other, the movement of the coupling sleeve 162 in the axial direction is stopped while the coupling sleeve 162 rotates relative to the input shaft 166 with the end face of the coupling sleeve 162 pressing the end face of the input shaft 166.

In this event, in Part (b) of FIG. 8, the operating-member-side projection 266 continues to rotate in the direction indicated by the arrow K in association with the lever 268 swinging in the direction indicated by the arrow J. On the other hand, the fork-side projection 264 stops rotating with the coupling sleeve 162 being stopped. Accordingly, the two end portions 267A and 267B of the helical torsion spring 267 are spaced apart from each other, so that the elastic force of the helical torsion spring 267 increases. As a result, the end portion 267B is caused to press the fork-side projection 264 by the elastic force. In other words, the end face of the coupling sleeve 162 shown in Part (a) of FIG. 8 presses the end face of the input shaft 166.

In this state, once the female spline 162a of the coupling sleeve 162 and the male spline 166b of the input shaft 166 mesh with each other, the fork-side projection 264, which has been pressed by the elastic force, rotates in a clockwise direction in Part (b) of FIG. 8, that is, the fork 164 swings. Accordingly, the coupling sleeve 162 shown in Part (a) of FIG. 8 moves from the output shaft 167 side to the input shaft 166 side in a straddling manner, so that the input shaft 166 and the output shaft 167 are connected to each other.

In Part (b) of FIG. 8, an angle range in which only the operating-member-side projection 266 rotates with the fork-side projection 264 being stopped is referred to as a lost motion angle θ, which corresponds to a range in which the coupling sleeve 162 does not move even when the lever 268 swings, that is, the motion of the coupling sleeve 162 is lost.

Refer back to FIG. 5 again. A lost motion mechanism 290 which generates the above-described lost motion angle consists of the fork 164, the operating member 263, the helical torsion spring 267, the fork-side projection 264, and the operating-member-side projection 266.

Moreover, the lever 268 shown in Parts (a) and (b) of FIG. 7 is operated in the direction opposite to the arrow A from a state, shown in Part (c) of FIG. 7, where the input shaft 166 and the output shaft 167 are connected to each other by the coupling sleeve 162. Along with this operation of the lever 268, the operating member 263 swings about the support shaft 261 in the direction opposite to the arrow B. This swing of the operating member 263 causes the ball 283, having been inserted in the notch 277B of the operating member 263, to roll over the bump portion 277a of the operating member 263 so as to be inserted in the notch 277A of the operating member 263.

As a result, in Parts (a) and (b) of FIG. 7, the operating-member-side projection 266 provided on the operating member 263 presses one of the end portions 267B of the helical torsion spring 267 in the direction opposite to the arrow C, so that the helical torsion spring 267 rotates about the support shaft 261 in the direction opposite to the arrow D. In association with the rotation of the helical torsion spring 267, the end portion 267A presses the fork-side projection 264 in the direction opposite to the arrow E. The fork 164 is thus caused to swing in the direction opposite to the arrow F, so that the coupling sleeve 162 moves in the direction opposite to the hollow arrow G in conjunction with the joint pieces 163.

In this event, in Part (c) of FIG. 7, frictional force is generated between the coupling sleeve 162 and the input shaft 166, as well as between the coupling sleeve 162 and the output shaft 167. When the frictional force is large, the distance between the end portions 267A and 267B of the helical torsion spring 267 is increased, and hence, the elastic force of the helical torsion spring 267 is increased. In this state, only the pressing of the fork-side projection 264 by the end portion 267A establishes the lost motion state in which the swing of the lever 268 does not move the coupling sleeve 162. On the other hand, when the frictional force is small, the coupling sleeve 162 is moved against the frictional force by the elastic force of the helical torsion spring 267.

Consider a case where the coupling sleeve 162, having been spline-connected to both of the input shaft 166 and the output shaft 167 as shown in Part (c) of FIG. 7, is moved so as to be spline-connected to only the output shaft 167 as shown in FIG. 4. In this case, the connection of the input shaft 166 and the output shaft 167 with each other is released, so that the driving force is not transmitted from the input shaft 166 to the output shaft 167.

The lost motion mechanism 290 described so far with reference to FIGS. 5 to 8 may be employed also in the differential locking device 193 shown in FIG. 4.

Specifically, the following structure may be also obtained. In FIGS. 4 and 5 as well as Part (a) of FIG. 6, the differential case 196, the intermediate shaft 192, the sleeve 208, the joint pieces 211, and the fork 212 correspond respectively to the input shaft 166, the output shaft 167, the coupling sleeve 162 (note that, the sleeve 208 is spline-connected to the differential case 196 and attached thereto so as to be movable in the axial direction), the joint pieces 163, and the fork 164. The support shaft 261, which is swingable with the lever, is provided in the second housing body 182 or the second housing cover 183. The fork 212 is swingably attached to the support shaft 261 while the operating member 263 is integrally attached to the support shaft 261. The helical torsion spring 267 is swingably wound around the support shaft 261, and has two end portions 267A and 267B extending to sandwich the fork-side projection 264 provided on the fork 212 and the operating-member-side projection 266 provided on the operating member 263. In this structure, the differential locking device 193 releases the differential lock when the sleeve 208 is spline-connected to only the differential case 196, while locking the differential when the sleeve 208 is spline-connected to both of the differential case 196 and the intermediate shaft 192 in a straddling manner.

The operation of the lost motion mechanism provided to the differential locking device 193 is the same as that of the lost motion mechanism 290 described with reference to FIGS. 5, 6, 7 and 8, and accordingly, will not be described.

As shown in FIGS. 1, and 4 to 6, the driving force interrupting mechanism 170 is configured as follows. The driving shaft 161 serving as a driving member for transmitting driving force to the front wheels 12 and 13 or the rear wheels 14 and 15 is connected to the engine 17 serving as a driving source of the all-terrain vehicle 10. In addition, the driving shaft 161 is rotatably supported in the first housing 156 being provided on the vehicle body side, and serving as a housing. This driving shaft 161 consists of: the input shaft 166 serving as an input member; and the output shaft 167 being arranged coaxially with the input shaft 166 and serving as an output member. The male splines 166b and 167b are formed respectively in the input shaft 166 and the output shaft 167. The coupling sleeve 162 is provided on one of the input shaft 166 and the output shaft 167 while being spline-connected thereto so as to be movable in the axial direction. The fork 164 for moving the coupling sleeve 162 is swingably mounted on the support shaft 261 serving as a swing shaft in the first housing 156 so as to allow the coupling sleeve 162 to be spline-connected also to the other one of the input shaft 166 and the output shaft 167 in a straddling manner. The driving force interrupting mechanism 170 transmits the driving force by connecting the input shaft 166 and the output shaft 167 to each other with the coupling sleeve 162, or interrupts the transmission of the driving force by disconnecting the coupling sleeve 162 from the other one of the input shaft 166 and the output shaft 167. In the driving force interrupting mechanism 170, the helical torsion spring 267 and the operating member 263 are provided to the support shaft 261. The helical torsion spring 267 is mounted on the support shaft 261 so as to be rotatable relative to the support shaft 261, and serves as a spring. The operating member 263 is rotated integrally with the support shaft 261. The helical torsion spring 267 is provided between the operating member 263 and the fork 164. The motion of one of the operating member 263 and the fork 164 is followed by the other one thereof in association with the elastic force of the helical torsion spring 267. This makes it possible to achieve the lost motion with a simple mechanism using the single helical torsion spring 267 in both of a state where the input shaft 166 and the output shaft 167 are connected to each other as well as a state where the input shaft 166 and the output shaft 167 are not connected to each other. Here, the lost motion refers to a movement of a first one of the operating member 263 and the fork 164 when a second one of the operating member 263 and the fork 164 does not move in association with the movement of the first one. Accordingly, the number of components for the lost motion can be reduced. Moreover, since the space in the first housing 156 can be saved along with the reduction in the number of components, the size of the first housing 156 can be reduced.

It is preferable that the helical torsion spring 267 be employed as the spring. The two end portions 267A and 267B of the helical torsion spring 267 are thus brought into contact with the operating member 263 and the fork 164, respectively. With this configuration, a biasing force can be applied, with a simple structure using the helical coil spring 267, to the fork 164 in both of a direction of connecting the driving force and a direction of interrupting the driving force. Further, the lost motion of the operating member 263 or the fork 164 can be achieved.

Moreover, the fork-side projection 264 and the operating-member-side projection 266, each serving as a projecting portion, are provided respectively to the fork 164 and the operating member 263. The fork-side projection 264 and the operating-member-side projection 266 are disposed between the two end portions 267A and 267B of the helical torsion spring 267. This arrangement makes it possible to achieve a compact structure in which the operating member 263 and the fork 164 are connected to each other with the fork-side projection 264, the operating-member-side projection 266, and the helical torsion spring 267 arranged in between. As a result, the size of the driving force interrupting mechanism 170 can be reduced.

In addition, the operating member 263 and the fork 164 are arranged along the support shaft 261, and the helical torsion spring 267 is provided between the operating member 263 and the fork 164. Accordingly, the support shaft 261, the operating member 263, and the fork 164 can be arranged compactly, so that the size of the driving force interrupting mechanism 170 can be reduced.

Moreover, the positioning mechanism 271 which positions the operating member 263 at positions corresponding respectively to the connecting and disconnecting of the driving force is provided in the first housing 156. Accordingly, the driving force can be securely interrupted by positioning the operating member 263 at a predetermined position with the positioning mechanism 271.

Furthermore, the operating member 263 is provided with the notches 277A and 277B which are positioned by the positioning mechanism 271. The operating member 263 is positioned in a way that a ball 283 included in the positioning mechanism 271 is pressed against one of these notches 277A and 277B, so that the operating member 263 is positioned. Accordingly, the operating member 263 can be positioned at a predetermined rotational position with a simple structure.

In the embodiment, the two end portions 267A and the 267B of the helical torsion spring 267 extend respectively from the parts wound around the support shaft 261 so as to intersect with each other. However, the present invention is not limited to this configuration. The two end portions 267A and 267B may alternatively be extended substantially in parallel with each other respectively from the parts wound around the support shaft 261 so as to sandwich the fork-side projection 264 and the operating-member-side projection 266.

INDUSTRIAL APPLICABILITY

The driving force interrupting mechanism according to the embodiments of the present invention may preferably be employed in a part-time four-wheel-drive vehicle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A driving force interrupting mechanism comprising:
   a housing;
   a driving member rotatably supported in the housing to transmit a driving force and comprising an input member and an output member which have a common rotational axis and each of which has a spline;
   a coupling sleeve spline-connected to at least one of the input member and the output member to be movable on the input member and the output member along the rotational axis;
   a swing shaft;
   a fork attached to the housing swingably around the swing shaft to move the coupling sleeve between a connecting position and a disconnecting position, the coupling sleeve being positioned on both of the input member and the output member in the connecting position, the coupling sleeve being positioned on either the input member or the output member in the disconnecting position;

an operating member integrally rotatable with the swing shaft; and a spring provided on the swing shaft between the operating member and the fork relatively rotatably with respect to the swing shaft, a motion of one of the operating member and the fork in a first direction about the swing shaft and in a second direction about the swing shaft following a motion of another of the operating member and the fork about the swing shaft in a respective direction via an elastic force of the spring.

2. The driving force interrupting mechanism according to claim 1, wherein the spring is a helical torsion spring having a first end and a second end, and wherein the first end is in contact with the operating member and the second end is in contact with the fork.

3. The driving force interrupting mechanism according to claim 2, wherein the operating member has a first projection with which the first end is in contact, and wherein the fork has a second projection with which the second end is in contact.

4. The driving force interrupting mechanism according to claim 1, wherein the operating member and the fork are arranged along an axis of the swing shaft, and wherein the spring is provided between the operating member and the fork.

5. The driving force interrupting mechanism according to claim 1, wherein the housing comprises a positioning mechanism configured to position the operating member in the connecting position and the disconnecting position.

6. The driving force interrupting mechanism according to claim 5, wherein the operating member has notches for positioning, and wherein the positioning member includes a ball which is to be pressed against the notches.

7. The driving force interrupting mechanism according to claim 1, wherein the spring is a single helical torsion spring.

8. The driving force interrupting mechanism according to claim 1, wherein the spring is a helical torsion spring and having two end portions configured to sandwich a fork-side projection provided on the fork and an operating-member-side projection provided on the operating member.

* * * * *